2,948,758
PURIFICATION OF PHENOL BY ADSORPTION OF IMPURITIES

Leo J. Filar, Wilmington, Del., assignor to Hercules Powder Company, Wilmington, Del., a corporation of Delaware No Drawing. Filed July 8, 1954, Ser. No. 442,219

1 Claim. (Cl. 260—621)

This invention relates to the purification of phenol and more particularly to the purification of phenol obtained by oxidation of cumene and subsequent cleavage of the cumene hydroperoxide.

Phenol produced by oxidizing cumene to the hydroperoxide and subsequently cleaving the hydroperoxide frequently contains genetic impurities which are not separable from the phenol by distillation. While these impurities are usually present in only minute amounts, they effectively prevent the purification of phenol to meet U.S.P. specifications by fractional distillation alone.

Now in accordance with the present invention it has been found that phenol containing these genetic impurities is readily purified by contacting the impure phenol in the liquid phase with a nonpolar adsorbent material, allowing the genetic impurities to be adsorbed, and separating the phenol from the adsorbent material to which the genetic impurities are adsorbed.

In carrying out the process of this invention impure phenol is contacted with a nonpolar adsorbent material under conditions that permit the impurities to adsorb on the adsorbent material. This is selective with respect to the impurities, and the phenol reduced in impurities is separated from contact with the adsorbent. The phenol is further purified to meet U.S.P. specifications by distillation.

The process in accordance with the invention is more particularly described in the following examples. In this specification all parts and percentages are by weight.

Example 1

Phenol containing genetic impurities produced in the process of its preparation from cumene by way of the hydroperoxide failed to meet U.S.P. specifications, since on dilution with water, a hazy solution resulted. This phenol was melted and agitated with 0.5% its weight of activated carbon at about 50° C. for about 10 minutes. The phenol was then filtered to remove the carbon. On distillation of this treated phenol through a column having approximately one theoretical plate a fraction amounting to 24.8% of the treated phenol met the U.S.P. solubility specification. In contrast, a sample of the untreated phenol containing genetic impurities gave no fraction meeting this U.S.P. specification when distilled through a 20 plate column. Those distillate fractions of the treated phenol which failed to meet the U.S.P. specification, on further treatment with activated carbon and subsequent distillation, gave a further phenol fraction amounting to about 24% which did meet U.S.P. specifications.

Example 2

A sample of the phenol containing genetic impurities which was used in Example 1 was percolated through a column containing 0.5% of its weight of activated carbon at about 50° C. The phenol so treated on distillation through a 20 plate column gave an 87% yield of phenol meeting U.S.P. specifications.

Examples 3 and 4

Example 2 was repeated with each of talc and precipitated chalk in place of activated carbon with substantially similar results, thereby obtaining phenol which on distillation gave at least 80% U.S.P. specification grade phenol in each instance.

Examples 5-8

Example 2 was repeated with bone char, beech charcoal, carbonized peat, and carbonized walnut shells as specific charcoals of known sources with substantially similar results. The resulting phenol, in each case, on distillation gave at least 80% U.S.P. specification grade phenol.

The adsorbents which are effective in the process of this invention for adsorbing genetic impurities from concentrated phenol are adsorbents which are classified as nonpolar adsorbents. Nonpolar adsorbents are adsorbents which adsorb by virtue of van der Waals' forces between molecules rather than by chemical bonding, and such adsorbents are essentially free of functional groups capable of bonding with oxygen-containing compounds. This includes such adsorbents as fuller's earth, precipitated chalk, heat activated clays, talc, and bentonite; the activated carbons such as bone char, blood charcoal; and carbonized nut shells, peat, anthracite, lignin, cellulose, sugars, and hard woods, all of which are operable to varying degress. The activated carbons are the more effective of the adsorbents and are preferred for that reason.

The adsorbent process is carried out by contacting the phenol with the adsorbent material either in a percolation process or in a contact filtration process. Moreover, the process may be continuous fractional adsorption with reflux if desired.

The phenol is treated in the process of this invention in the liquid phase. To this end, the phenol is treated at a temperature at which it is liquid. The adsorption is thus generally carried out at a temperature in the range of about 40° C. to about 60° C.

The phenol freed of genetic impurities by the adsorption process is further purified by distillation in order to produce a product meeting U.S.P. specifications.

The process of this invention is particularly applicable to phenol produced by oxidation of cumene to the hydroperoxide followed by cleavage of the hydroperoxide. It is applicable not only in the case where the cumene used was pure cumene but also where the cumene used was prepared by alkylation with refinery gases containing butylenes. Thus the process of this invention is also applicable for removal of genetic impurities derived not only from cumene but from the butyl benzenes as well. The term "genetic impurities" as used herein, therefore, includes such impurities as are derived from butyl benzene alone and as contaminants of cumene subjected to the oxidation step. Moreover, genetic impurities removable from phenol by the present process also include those formed in the cracking of the phenol residues which contain 7-hydroxycumene, cumylphenol and α-methylstyrene polymers and which yield therefrom α-methylstyrene and cumene as genetic impurities in the phenol also produced in the cracking operation. Such impurities formed as by-products in the phenol process all boil slightly above or below the boiling point of phenol or form azeotropes boiling slightly above or below the boiling point of phenol and are the type of genetic impurities which are removed from the phenol in the process of this invention.

What I claim and desire to protect by Letters Patent is:
The method of purifying phenol produced by cleavage of cumene hydroperoxide and containing minute amounts of cumene, α-methylstyrene and butyl benzenes as genetic impurities, which comprises contacting said phenol in the liquid state with a nonpolar solid adsorbent selected from the group consisting of fuller's earth, precipitated chalk, heat activated clay, talc, bentonite and activated carbon, separating the treated phenol from the adsorbent and fractionally distilling the treated phenol to separate a fraction of pure phenol.

References Cited in the file of this patent

UNITED STATES PATENTS

| | | |
|---|---|---|
| 2,124,171 | Story | July 19, 1938 |
| 2,415,069 | Arvin et al. | Feb. 4, 1947 |
| 2,628,983 | Aller et al. | Feb. 17, 1953 |
| 2,673,834 | Stevens et al. | Mar. 30, 1954 |
| 2,679,535 | Lavender et al. | May 25, 1954 |
| 2,727,925 | Walker et al. | Dec. 20, 1955 |
| 2,744,938 | Urban | May 8, 1956 |